Feb. 1, 1966
T. C. PAYNE
3,232,767
PROCESS FOR ROASTING MEAT
Filed Aug. 30, 1962
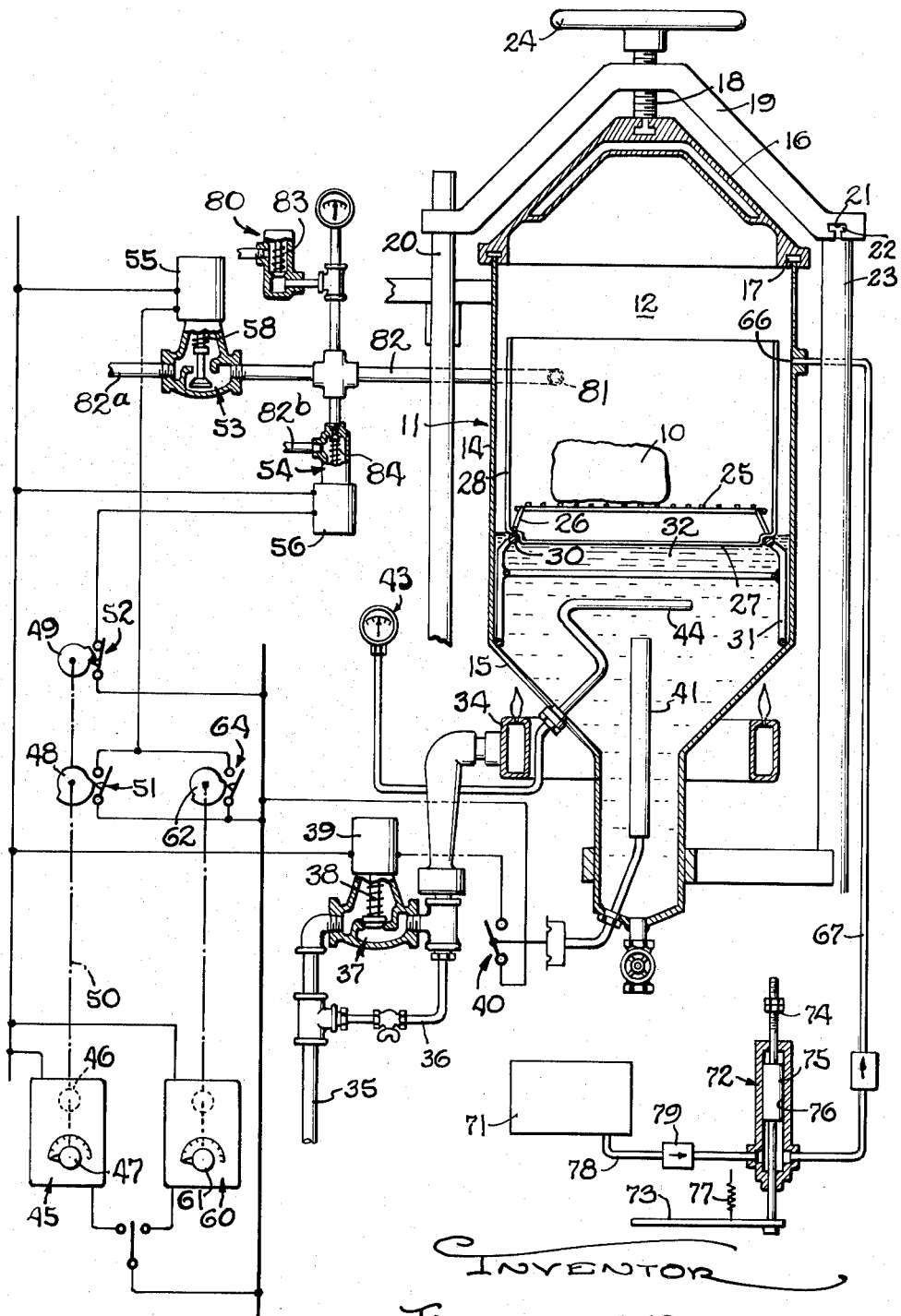
INVENTOR
Thomas C. Payne
By Wolfe, Hubbard, Voit & Osann
ATTORNEY

United States Patent Office 3,232,767
Patented Feb. 1, 1966

3,232,767
PROCESS FOR ROASTING MEAT
Thomas C. Payne, % The Broaster Co., Rockton, Ill.
Filed Aug. 30, 1962, Ser. No. 220,483
4 Claims. (Cl. 99—107)

The general object of this invention is to cook meat by exposure to heated air so as to produce a browned appearance and a flavor equivalent to conventional oven roasting but in a period substantially less than half of that ordinarily required for a given degree of cooking.

A further object is to provide a process for quick roasting meat including browning with substantially less loss of natural juices and shrinkage than has been possible heretofore.

A more detailed object is to effect the rapid roasting by imparting heat to the meat in a novel manner while the meat is disposed in a chamber heated to a temperature and under a pressure substantially higher than has been possible heretofore.

Another object is to correlate the cooking temperature and pressure in a novel manner to achieve proper browning of the meat by the time it is cooked.

Still another object is to produce the cooking pressure in a simple and novel manner.

A further object is to carry out the quick roasting in a cooker usable alternatively for the deep fat immersion and pressure cooking of meat.

Another object is to transfer heat to the meat from a heated body of cooking fat within the pressure chamber and dissipate the pressure in a novel manner preventing contact between the fat and the cooked meat.

Other objects and advantages of the invention will become apparent from the following detailed description taken in connection with the accompanying drawing which is a vertical sectional view of apparatus for practicing the improved process, the associated controls being shown schematically.

Generally stated, the improved process includes the steps of supporting the body 10 of the meat to be roasted in a vessel 11 disposed in a closed and pressure tight air chamber 12, creating a super-atmospheric pressure in the chamber so as to raise the boiling point of the natural juices in the meat from the normal boiling point, 212 deg. F. at atmospheric pressure, to a substantially higher temperature, for example 281 deg. F. at 35 p.s.i., heating the air in the chamber to a temperature substantially higher, for example more than 10 deg. F. above said boiling point of the meat juices, and maintaining such correlated temperature and pressure for a period sufficient to cook the meat to the desired degree while simultaneously browning the surface thereof.

While various types of cookers may be constructed to subject the meat to the proper temperature and pressure in accordance with the foregoing method, it is preferred to employ a cooker of the general type shown in Patent No. 2,827,379 so that the cooker may be used alternatively for other kinds of cooking, particularly cooking by immersion of meat in deep fat. In the form shown, the air chamber 12 is defined by a generally cylindrical tank 14 having in this instance a frusto-conical bottom 15 and adapted to be closed tightly by a cover 16 providing a suitable seal 17 capable of withstanding relatively high pressure, for example more than 30 p.s.i.

Herein, the cover is suspended from the lower end of a screw 18 threaded through a bracket 19 pivoted at one end on a rod 20 to swing horizontally into and out of alinement with the tank. A T-slot 21 in the outer end of the bracket is adapted to interlock with a head 22 on the upper end of a rod 23 when the cover is alined with the tank. By turning a handle 24, the screw may be turned to press the cover and gasket down against the upper end of the tank with the required clamping pressure.

While being roasted, the body 10 of meat is supported on the top of a suitable rack 25 having depending legs 26 resting on the horizontal bottom 27 of a vessel 28 which is composed of metal to provide proper conduction of heat to the air chamber 12 which is defined by the generally cylindrical side wall of the vessel. The latter rests on another rack 30 removably disposed in the bottom portion of the tank 14 having depending legs 31 of such length that the bottom 27 is, in accordance with one aspect of the present invention, immersed in or in good heat conducting relation with respect to a body 32 of cooking oil such as fat contained in the bottom of the tank but spaced well below the cover 16 to provide ample volume for the cooking chamber 12.

The vessel 28 is of substantial depth to provide a roasting chamber of the desired volume and telescopes loosely within the tank with its upper end spaced below the cover 16 when in operating position. It will be apparent that both the vessel 28 and the rack 30 may be lifted out of the tank thus adapting the cooker for alternative use in deep fat cooking.

The body 32 of melted fat is utilized as a medium for transferring heat from a controllable outside source to the air in the roasting chamber 12. Herein, such heat is derived from a gas burner 34 encircling the bottom of the tank with the flames thereof angularly spaced around the tank. A continuous flow of gas from a supply pipe 35 is admitted to the burner through a by-pass conduit 36 thus maintaining a heat delivery somewhat below that required to maintain the desired temperature of the liquid. Regulation of the heater to maintain the desired constant temperature is accomplished by opening and closing of a valve 37 in the main gas supply line to the burner. This valve is normally closed by a spring 38 and opened by energization of a solenoid 39 in response to closure of a switch 40 of the thermostat 41, the switch being opened when the temperature of the liquid rises above the desired value determined by the usual adjustment of the thermostat. The prevailing temperature of the cooking liquid 32 is indicated on the scale of a thermometer 43 having a bulb 44 disposed in the liquid.

During the cooking period, the pressure within the chamber 12 is maintained automatically, usually within a range of from 30 to 35 p.s.i., by a pressure responsive valve 80 controlling the escape of air from the chamber through an outlet 81 and a pipe 82 opening to the atmosphere beyond the valve. By adjusting a spring 83, the pressure at which the valve opens may be varied as desired.

After termination of the cooking period, the pressure in the tank is released first at a restricted rate for a short interval, usually two minutes, by opening of a valve 54 and then at a rapid rate through a valve 53 in an extension 82ª of the pipe 82. The valve 53 is biased open by a spring 58 and closed upon energization of a solenoid 55. The valve 54, which is in an extension 82ᵇ of the pipe 82, is normally closed by a spring 84 and opened upon energization of a solenoid 56, the rate of dissipation of the pressure being determined by adjusting the size of the valve orifice.

The duration of the cooking period is determined by a selectively adjustable timer 45 which is of well-known construction and includes a motor 46 which is started in response to turning of a knob 47 clockwise away from the zero position shown to a position corresponding to the desired length of the cooking period for the particular kind of meat to be cooked. Cams 48 and 49 on the output shaft 50 of the timer control the opening and closing of switches 51 and 52 and the selective energization of the valve solenoids 55 and 56. The valve 53 is closed by energization of the solenoid 55 in response to closure of the switch 51 by the cam 48 in the turning of the shaft 50 which accompanies the clockwise turning of the selector knob 47 away from the zero position to set the timer for the selected cooking period. Such setting is accompanied by closing of the switch 52 by the cam 49 and energization of the solenoid 56 to close the valve 54. The construction of the cams is such that at the end of the selected cooking period, the cam 49 allows the switch 52 to close for a predetermined interval, for example two minutes, during which the solenoid 56 is energized and the valve 54 is opened to release the pressure from the tank at a slow rate. The valve remains closed until, after expiration of this period, the timer shaft 50 is returned to zero position, the switch 51 being allowed to open thus opening the valve 55 to dissipate the remaining pressure quickly.

By releasing the pressure in the chamber 12 initially at a slow rate, substantial expansions of the liquid 32 upwardly and over the top of the vessel 11 which is liable to occur in response to sudden release of a pressure as high as 30 p.s.i. is effectually prevented. Accordingly, the liquid which might impart an objectionable flavor to the roasted meat is prevented from coming in contact with the meat as an incident to termination of the cooking cycle preparatory to removing the cooking meat from the tank.

Control of the cooking period during deep fat cooking as contemplated in the aforesaid patent is preferably by a separate and similar motor operated timer 60 having a manually adjustable selector 61 and an output shaft with a cam 62 thereon adapted, at the expiration of the selected cooking period, to open a switch 64 and deenergize the solenoid 55 to open the valve 53. This effects a rapid dissipation of the tank pressure preparatory to another cooking cycle.

The invention also contemplates a unique method of creating a cooking pressure of the desired magnitude within the chamber 12, that is, by utilizing the heat available within the tank to generate steam by evaporation of a measured amount of water placed within the tank. Preferably, the water charge is injected into the tank through a nozzle 66 disposed below the lip of the vessel so that the injected charge of water falls directly down into the fat. A supply of water is contained in a storage tank 71 and withdrawn in measured amounts by a pump 72 adapted to be actuated by manually depressing a foot pedal 73 through a distance determined by adjustment of a stop 74. Herein, the pump comprises a piston 75 reciprocable in a cylinder 76 and urged upwardly by a spring 77 to the position shown. Water from the tank gravitates into the cylinder through a pipe 78 having a check valve 79 interposed therein. As the pedal is depressed and the piston moves down, the valve 79 closes and the water trapped in the cylinder is forced out through a pipe 67 and is delivered through the nozzle 66 into the cooking vessel. When the pedal is released, the check valve opens allowing the cylinder to be refilled by upward movement of the piston under the action of the spring 77.

The charge of water forced into the tank vaporizes rapidly producing steam and developing a pressure in the chamber 12 proportional to the volume of water delivered. In the present instance where the roasting chamber 12 is twelve inches in diameter and its volume is about 900 cubic inches, a charge of about four ounces of water would be used to create the desired pressure of substantially 30 p.s.i.

*Operation*

In carrying out the improved roasting process, superatmospheric pressure is created in the chamber 12 to raise the boiling point of the neutral juices in the meat from 212 deg. F. to a substantially higher temperature, above 255 deg. F. and preferably to 274 to 281 deg. F. A boiling point temperature of above 255 deg. F. is considered a practical minimum for the commercial practice of the process, while boiling point temperatures of 274 to 281 deg. F., obtained with pressures of 30 to 35 p.s.i., are the preferred temperatures for optimum performance with presently available cooking oils.

In order to obtain browning of the meat under the foregoing circumstances, the air in the chamber is maintained at a temperature substantially above the boiling point produced by the superatmospheric pressure created. Of course, the amount of the differential determines the rate of browning. While a 10 degree differential may be adequate under some circumstances, a differential of greater than 20 degrees should be used in commercial practice to make full use of the advantages of the present invention. For this purpose the fat is maintained at a temperature well over 350 deg. F. to produce an air temperature of over 300 deg. F. Obviously, the total time will vary with the size of the piece of meat being roasted, with the type of meat, and with the thoroughness of cooking desired.

Assume that it is desired to cook a 14.5 pound piece of prime rib of beef to a so-called "rare" state, as evidenced by the attainment at the center-most point in the piece of meat of 140 deg. F. Conventional standards, for example Food for Fifty, Fourth Edition, require roasting in an ordinary oven for a period of 18–30 minutes per pound, or, in other words, for 261–435 minutes. Let it also be assumed that the improved roasting process is to be carried on at a pressure in the chamber 12 of 30–35 p.s.i. and that the fat is maintained at a temperature of 375 deg. F. so that, by conduction of heat through the metallic vessel 11, the air in the chamber 12 is maintained quite closely at 310 deg. F. At these values of temperature and pressure, it has been found that "rare" cooking of beef combined with thorough surface browning may be achieved in a cooking period of between 5½–7 minutes per pound or, in other words, about one-fourth of the time required in oven roasting.

Accordingly, after the beef to be roasted has been placed in the vessel 11 and supported on the rack 25 above the bottom of the vessel and out of contact with the sides thereof, the cover 16 is tightened to seal the tank closed and the proper charge of water, about four ounces, is forced into the tank by depressing the pedal 73. Then, the timer 45 is set for a cooking period of 90 minutes, the valve 53 being closed by energization of the solenoid 55 while the solenoid 56 is deenergized to allow its valve 54 to close. Since the cooking liquid 32 is heated to 375 deg. F., the water charge injected after closure of the tank is evaporated rapidly creating the desired cooking pressure, the chamber 12 being maintained at about 310 deg. F.

At pressures from 30 to 35 p.s.i., the boiling point of water in the natural meat juices is 274 to 281 deg. F. As a result, none of the natural juices will be lost until the surface of the piece of meat has become heated to above this temperature.

The cooking of the meat, that is, heating the natural juices therein, proceeds rapidly under the substantial pressure involved, the temperature of the juices at the surface of the piece being increased rapidly substantially to the temperature of the air in the chamber 12 and decreasing progressively and inwardly to the center of the piece as the cooking proceeds. As soon as the surface temperature attains a value above the boiling point (281 deg. F.) of the juices in the chamber pressure (35 p.s.i.), water starts to evaporate from the surface portion of the piece. Then, when all of the water in this portion has been vaporized, the meat fibers will be conditioned for browning or, in other words, charring by the heat resulting from maintenance of the surrounding air at a temperature well above the prevailing boiling point of the meat juices. Such browning continues throughout the remainder of the cooking period during which the temperature at any point within the piece increases progressively. As a result, the extent of the browning is determined by the remaining length of the selected cooking period following attainment of the boiling point temperature of the juices at the outside surface of the meat.

The extent of the browning also varies with the kind of meat being roasted. For most meats, cooking by the improved high pressure-high temperature method above described results in a degree of browning comparable to conventional oven cooking with the possible exception of poultry. If further browning is desired, this may be accomplished by placing the poultry or other roasted meat in a broiling oven for a short period.

In the improved process as described above, it will be apparent that as a result of the high pressure and the maintenance of the air chamber at a temperature substantially higher than the boiling point of water at the maintained pressure, the natural juices are heated and the meat thus cooked at a very rapid rate without at the same time maintaining a temperature difference between the surrounding air and the boiling point of the juices sufficiently great to boil away a substantial part of the juices during the cooking. As a result of retaining such a large part of the juices in the cooked piece, the desired flavor is obtained and the shrinkage of the piece is greatly reduced. As compared with conventional roasting, actual comparative tests show that in cooking a 14.5 pound prime rib roast to a rare condition in a conventional oven, the weight shrinkage is 28 percent and only 15 percent with the present improved process.

The improved process is especially advantageous for use in the roasting of all kinds of meat in commercial or restaurant cooking because of the substantial reduction attainable in time and therefore in labor and equipment involved. In other words, the improved process attains the ultimate in the rapid cooking of meat by raising the temperature of the meat juices to the highest cooking temperature in the shortest period of time. The substantial saving thus achieved is shown in the following table which compares the recommended times required for roasting various kinds of meats in conventional ovens with the improved process.

| Type of Meat | Minutes Per Pound [1] | Minutes Per Pound [2] |
| --- | --- | --- |
| Beef Rare | 18-30 | 5½-7 |
| Beef Medium | 22-40 | 6-8 |
| Beef Well | 27-50 | 7-9 |
| Veal | 25-35 | 12-14 |
| Pork, fresh | 30-50 | 10-12 |
| Ham Cured, partially cooked | 18-20 | 9-11 |
| Turkey 8-10 lbs | 25-30 | 6-8 |

[1] Reference—Food For Fifty, Fourth Edition.
[2] Improved process.

Still another advantage of the improved process is that it may be performed in apparatus which may be utilized for other kinds of cooking. This is accomplished by using the closed tank of the aforesaid patent as the cooking chamber 12 and the body of heated fat as a medium for transferring heat from the burner 34 to the air in the roasting chamber 12. For these purposes, it is only necessary to remove the already removable rack supporting the immersed meat in the patented process and substitute the removable vessel 11 and the rack 30 with the latter constituted to support the vessel in proper heat conducting relation with respect to the heated cooking liquid.

The preferred value of temperature given above is determined largely by the temperature which governmentally approved cooking oils will withstand before smoking. If and when oils permitting of higher operative temperature become available, the temperature and pressure maintained in the chamber 12 may be increased correspondingly thus further reducing the cooking period required for any given meat.

Also, it will be apparent that where longer cooking periods are permissible, the pressure and temperature within the cooking chamber may be reduced. In any case, it is desirable to maintain a temperature of more than ten degrees above the boiling point of water at the pressure maintained in the chamber. This pressure should, in order to avoid greatly increasing the cooking periods recommended in the above table, be at least 20 p.s.i.

I claim as my invention:

1. The method of roasting meat in a pressure chamber partially filled with cooking oil, said method including the steps of, supporting a body of meat in the air in said pressure chamber above and out of contact with said oil, creating and maintaining in said chamber a preselected superatmospheric pressure of about 30-35 p.s.i. and thereby raising the boiling point of the natural juices in the meat from 212 deg. F. to a predetermined higher temperature of about 274-281 deg. F., heating the oil to a temperature of about 375 deg. F. sufficient to heat the air surrounding said meat to a temperature of about 310 deg. F., and maintaining said oil temperature for a period of from 5½ to 14 minutes per pound of meat sufficient to cook the meat in the heated air to a desired degree.

2. The method of rapidly roasting meat in a pressure chamber partially filled with cooking oil to produce the appearance, tenderness and flavor at least equivalent to meat roasted in a conventional oven, said method including the steps of, supporting the meat within a vessel composed of heat conducting material with the meat spaced out of direct contact with the oil and the sides and bottom of the vessel, supporting the vessel in the air within said chamber with the bottom thereof in direct contact with said oil and the top thereof above the level of the oil, closing said chamber, maintaining the oil heated to a temperature of about 375 deg. F. to provide an air temperature within the vessel of about 310 deg. F., increasing the pressure in said chamber to about 30 to 35 p.s.i. by injecting water into said chamber to be vaporized therein, and, after a period of from 5½ to 14 minutes per pound of meat sufficient to cook the meat and produce a browned and roasted surface appearance, dissipating said pressure and removing the cooked meat from said vessel.

3. The method of rapidly roasting meat in a pressure chamber partially filled with cooking oil to produce the appearance, tenderness and flavor at least equivalent to meat roasted in a conventional oven, said method including the steps of, supporting the meat within a vessel composed of heat conducting material with the meat spaced out of direct contact with the oil and the sides and bottom of the vessel, supporting the vessel in the air within said chamber with the bottom thereof in direct contact with said oil and the top thereof above the level of the oil, closing said chamber, maintaining the oil heated to a temperature greater than 350 deg. F., increasing the pressure in said chamber to more than 20 p.s.i., and, after a period sufficient to cook the meat and produce a browned and roasted surface appearance, slowly reducing the pressure in said chamber for a period of approximately two minutes to prevent expansion of said oil upwardly in said chamber to a level above the top of said vessel whereby to prevent any of said oil from coming into contact with the cooked meat, then further reducing the pressure in said chamber to approximately atmospheric pressure, and removing the cooked meat from the vessel.

4. The method of rapidly roasting meat in a pressure chamber partially filled with cooking oil to produce the appearance, tenderness and flavor at least equivalent to meat roasted in a conventional oven, said method including the steps of, supporting the meat within a vessel composed of heat conducting material with the meat spaced out of direct contact with the oil and the sides and bottom of the vessel, supporting the vessel in the air within said chamber with the bottom thereof in direct contact with said oil and the top thereof above the level of the oil, closing said chamber, maintaining the oil heated to a temperature of about 375 deg. F. to provide an air temperature within said vessel of about 310 deg. F., delivering a predetermined quantity of water into said chamber to create therein a steam pressure of about 30–35 p.s.i., and, after a period of from 5½ to 14 minutes per pound of meat sufficient to cook the meat and produce a browned and roasted surface appearance, dissipating said pressure slowly at first and finally to approximately atmospheric pressure, and removing the cooked meat from said vessel.

References Cited by the Examiner
UNITED STATES PATENTS

| | | | |
|---|---|---|---|
| 466,137 | 12/1891 | Hobson | 99—107 |
| 2,827,379 | 3/1958 | Phelan | 99—1 X |
| 3,085,498 | 4/1963 | Falla | 99—347 |
| 3,087,414 | 4/1963 | Gannon | 99—259 |

A. LOUIS MONACELL, *Primary Examiner.*

HYMAN LORD, *Examiner.*